April 3, 1962 G. W. BELL 3,027,954
NAIL BOXING AND WEIGHING MACHINE
Filed Sept. 24, 1957 6 Sheets-Sheet 1

Inventor
GEORGE W. BELL
by Hill, Sherman, Meroni, Gross & Simpson Attys.

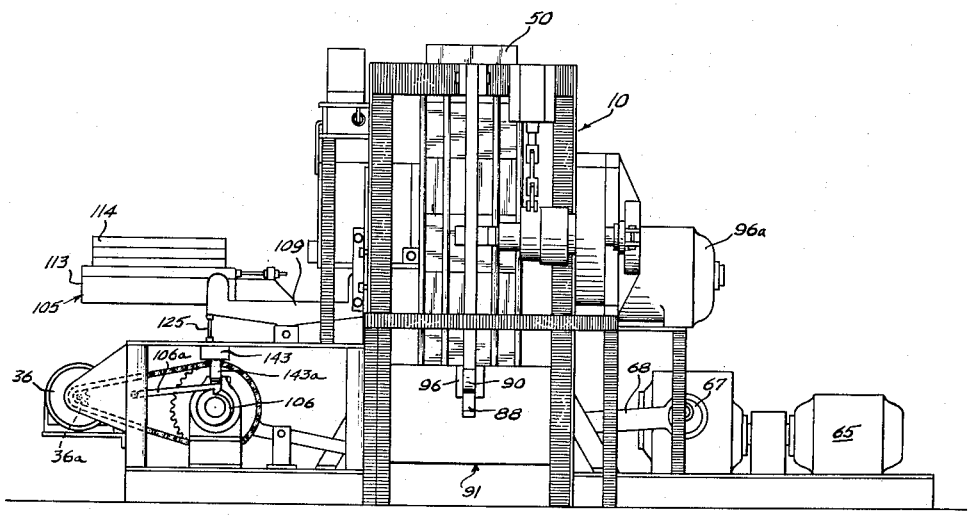
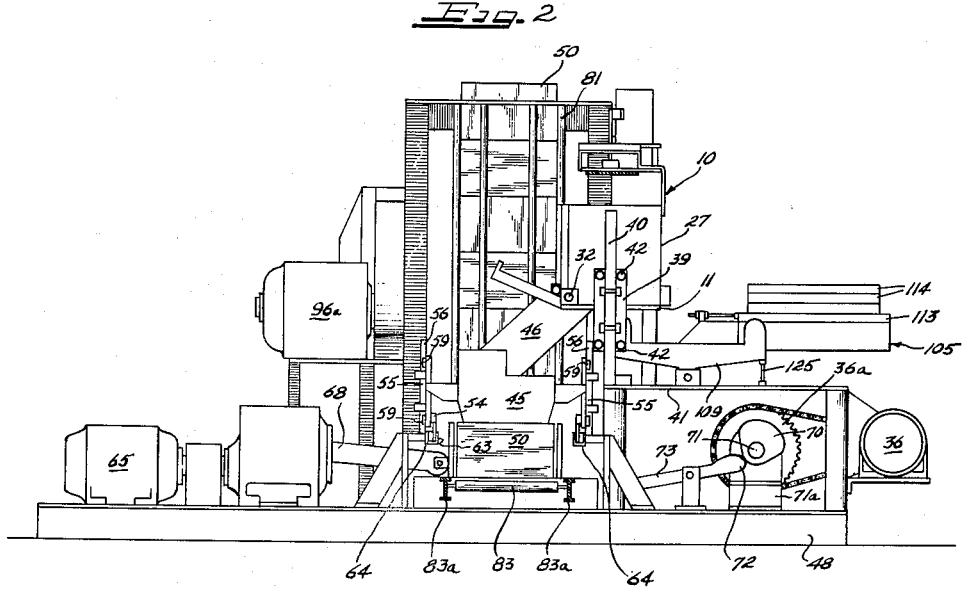

Inventor
GEORGE W. BELL

April 3, 1962 G. W. BELL 3,027,954
NAIL BOXING AND WEIGHING MACHINE
Filed Sept. 24, 1957 6 Sheets-Sheet 4
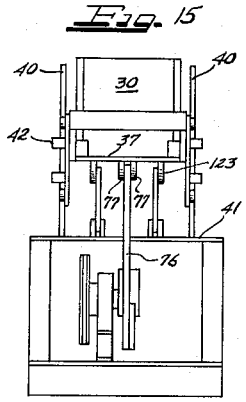
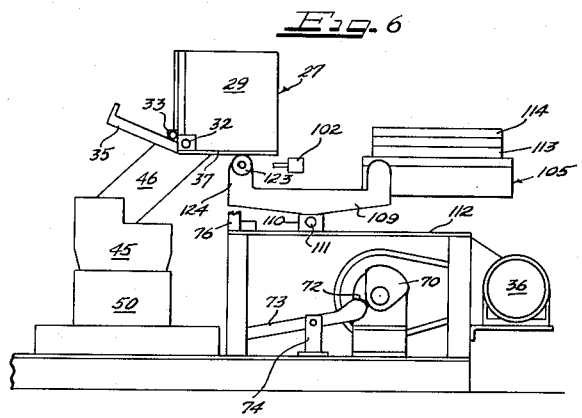
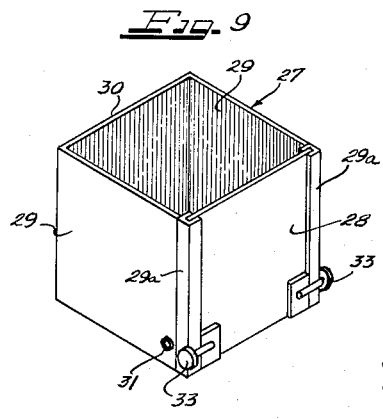
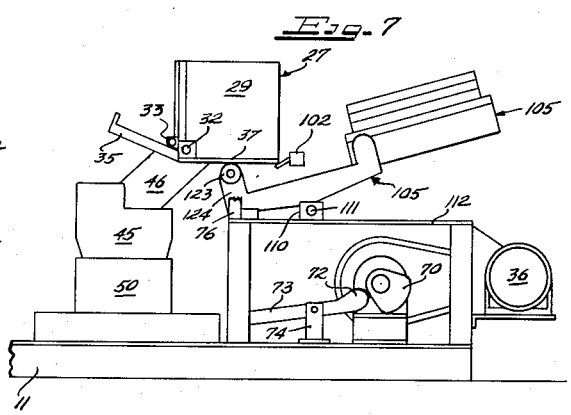
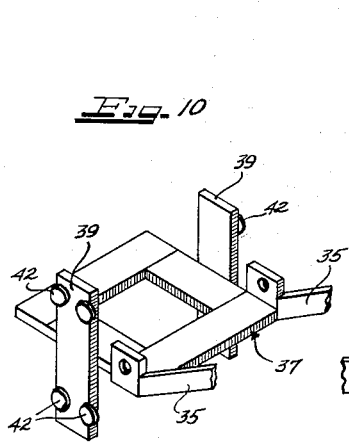
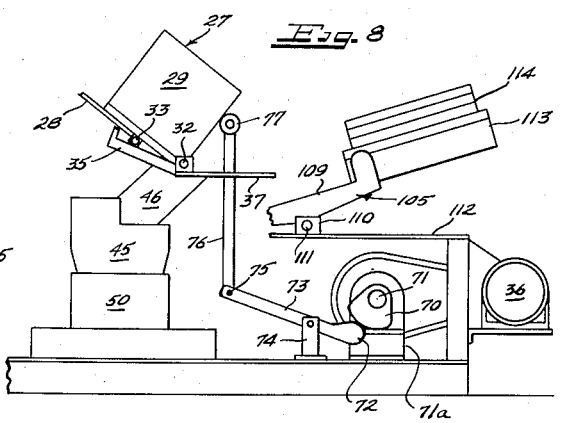
Inventor
GEORGE W. BELL
by Hill, Sherman, Meroni, Gross & Simpson Attys.

April 3, 1962  G. W. BELL  3,027,954
NAIL BOXING AND WEIGHING MACHINE
Filed Sept. 24, 1957  6 Sheets-Sheet 5
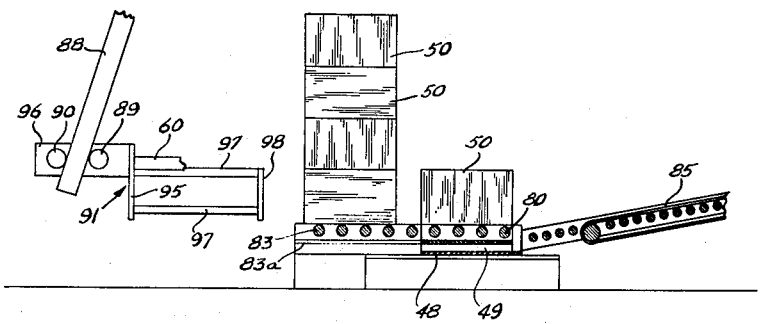
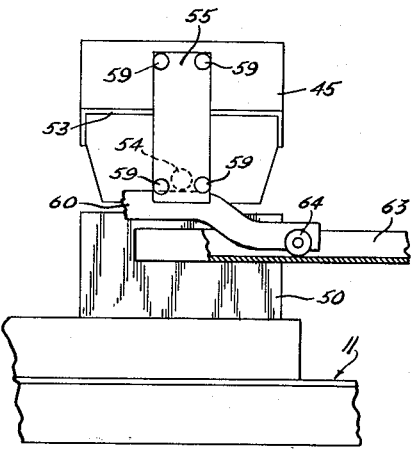
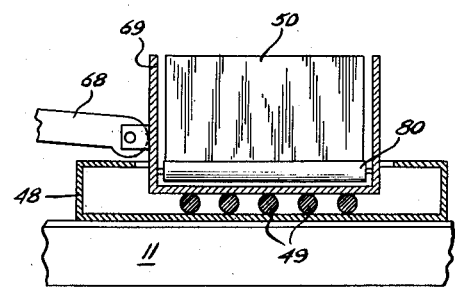
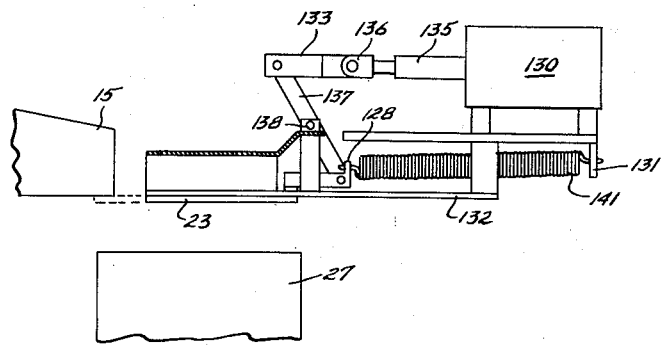
Inventor
GEORGE W. BELL
by Hill, Sherman, Meroni, Gross & Simpson Attys.

Inventor
GEORGE W. BELL
by Hill, Sherman, Meroni, Gross & Simpson Attys.

United States Patent Office 3,027,954
Patented Apr. 3, 1962

---

3,027,954
NAIL BOXING AND WEIGHING MACHINE
George W. Bell, Sterling, Ill., assignor to Northwestern Steel & Wire Co., Sterling, Ill., a corporation of Illinois
Filed Sept. 24, 1957, Ser. No. 685,860
10 Claims. (Cl. 177—52)

This invention relates to improvements in automatic nail weighing and boxing machines.

A principal object of the invention is to provide a simple and improved form of nail weighing and boxing machine arranged with a view toward utmost accuracy in weighing and simplicity and efficiency in operation.

Another object of the invention is to provide a simplified and improved form of nail weighing and boxing machine in which a weigh box is balanced in a weighing and filling position by weighing mechanism, and in which overbalancing of the weight mechanism caused by filling of the box with nails instigates the dumping of the weigh box and a boxing operation and terminates the filling operation of the weigh box.

A still further object of the invention is to provide an automatic nail weighing and boxing machine in which nails are weighed on the balancing principle and boxed by dumping the box upon overbalance thereof into a nail container to fill the same by gravity.

A still further object of the invention is to provide a simple and improved automatic nail weighing and boxing machine in which weighing is effected by a beam and weight balancing mechanism lowering the weigh box to effect a substantially continuous nail filling and boxing operation and instituting a filling operation upon upward movement of said weigh box by the discharge of nails therefrom.

This invention contemplates a machine which is particularly suitable for automatically weighing and packaging wire and metal goods such as nails, or the like, and which may cooperate with a nail washing and cleaning machine and package the clean nails in packages of uniform weight. The nails discharged from any source, such as a cleaning machine, may be collected by the packaging and weighing machine in a conveying means such as a vibrating chute, conveying the nails to a weigh box mounted in material receiving relation with respect to the discharge end of the chute.

As the weigh box is filled with nails it overbalances a weighing mechanism therefor and is lowered by gravity against the weighing mechanism, to stop operation of the vibrating chute, tilt the weigh box to dump the same, shake the boxing container to be filled with nails, to arrange the nails therein in densest relation, to effect the removal of a full box by the replacing of an empty box in material receiving relation with respect to the weigh box. After dumping of the weigh box the empty weigh box is returned to its normal position by gravity and vertically raised into a filling position by the weighing mechanism, which institutes a next succeeding filling and weighing operation, as the full box is deposited upon a conveyor and carried away for shipping. The operation of the machine is thus all under the automatic control of the weigh box weighing and emptying of the nails.

These and other objects of the invention will appear from time to time as the following specification proceeds and with reference to the accompanying drawings wherein:

FIGURE 2 is a front elevational view of the machine shown in FIGURE 1, with certain parts shown in section;

FIGURE 3 is a rear elevational view of the machine shown in FIGURE 1;

FIGURE 6 is a diagrammatic, fragmentary view of the machine shown in FIGURE 1, showing the weighing mechanism in normal position;

FIGURE 7 is a diagrammatic, fragmentary view somewhat similar to FIGURE 6, but showing the weighing box in a lowered position with the weighing beam in raised operated position;

FIGURE 8 is a diagrammatic, fragmentary view somewhat similar to FIGURES 6 and 7 and showing the weighing box in tilted position for discharge of the contents therein;

FIGURE 9 is a perspective view of the metal weighing box;

FIGURE 10 is a fragmentary perspective view of the weighing box-carrier frame;

FIGURE 11 is a fragmentary detail side view of the metal hopper showing the elevating means therefor broken away;

FIGURE 12 is a fragmentary detail vertical sectional view of the box carriage and shaker means;

FIGURE 13 is a diagrammatic representation of the pusher device and the empty cartons adjacent thereto;

FIGURE 15 is a fragmentary detail view of the metal weighing box and supporting parts therefor;

FIGURE 16 is a fragmentary detail view of the chute closing device and associated parts.

Figure 4:
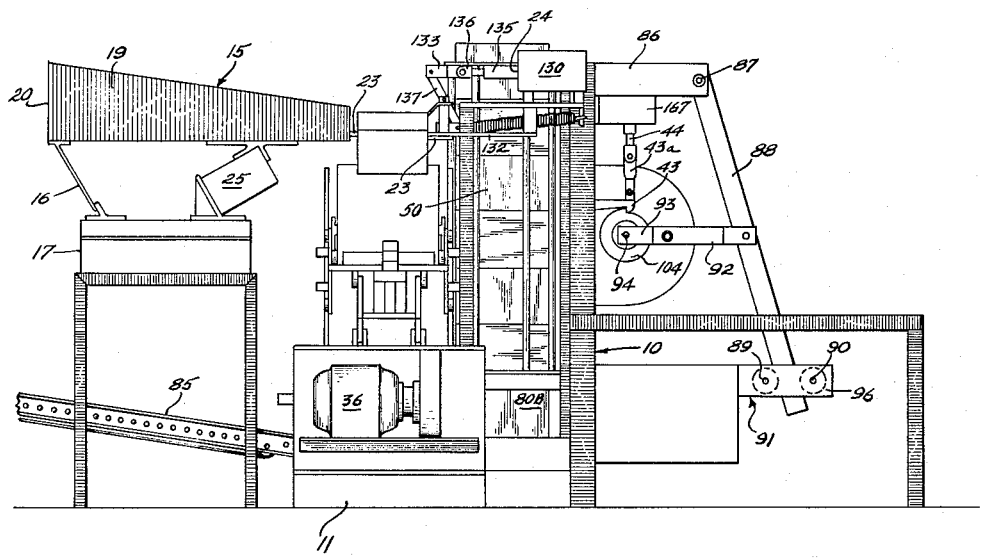
FIGURE 4 is an end elevational view of the machine diagrammatically showing the single revolution clutch which effects the replacement of the filled box.
Figure 5:
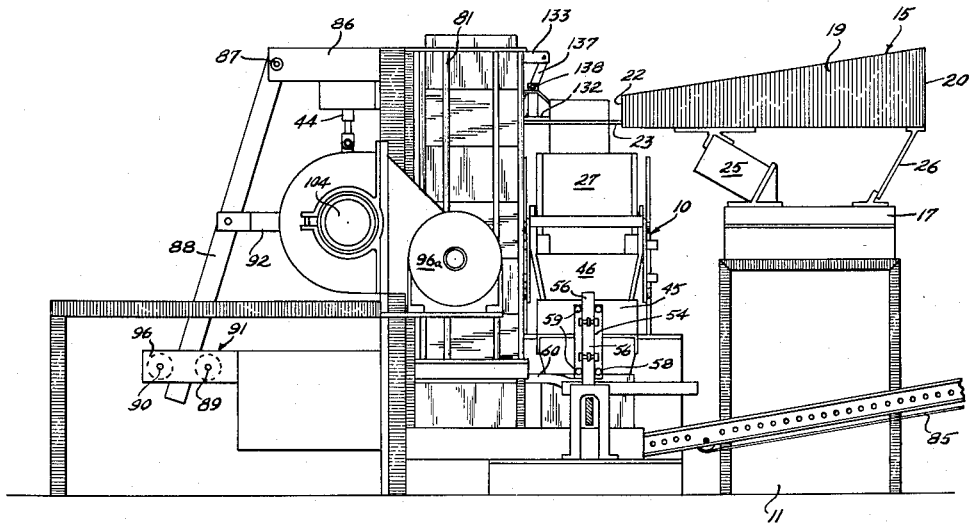
FIGURE 5 is an end elevational view of the machine showing specifically the vibrating tray-type chute, the weighing box, the hopper, and the conveyor, with certain parts shown in section.

In the embodiment of the invention illustrated in the drawings, I have shown an automatic nail weighing and boxing machine 10, including a main frame 11 supporting a nail feeding means, herein shown as being a vibrating chute 15 having a discharge end 22 in matreial discharge relation with respect to a weigh box 27. The vibrating chute 15 is shown in FIGURES 4 and 5 as extending generally horizontally and is mounted adjacent its discharge end upon a vibrating means 25 and adjacent its rear end on a yieldable support leg 16 extending upwardly from a base plate 17. The vibrating means may be an electrically operated vibrating means of any well known form so need not herein be shown or described in detail.

Figure 1:
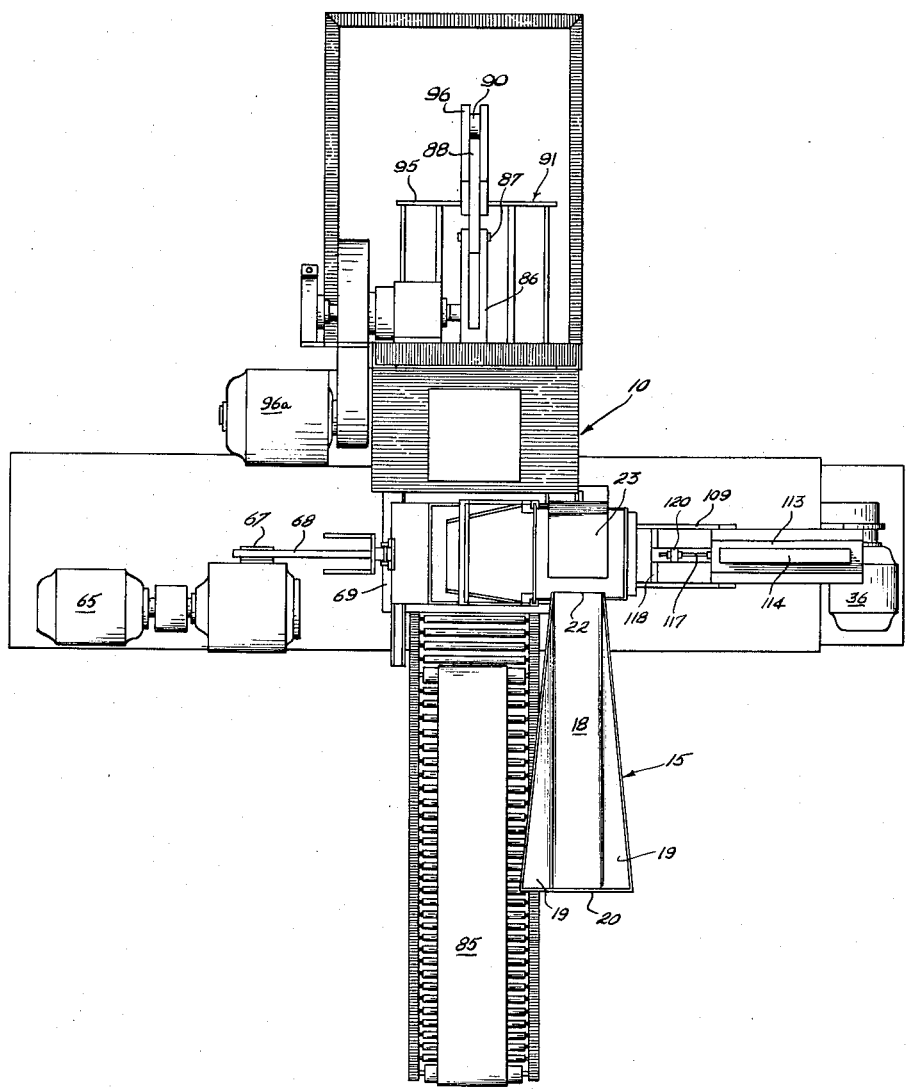
FIGURE 1 is a top plan view of a weighing and boxing machine constructed in accordance with the present invention and showing the conveyor for the transporting of the filled boxes.

The chute 15 has a flat bottom 18 with inclined side walls 19 extending along opposite sides thereof and a rear end wall 20 closing the rear end thereof. As shown in FIGURE 1, said chute has an open forward end 22, to effect the discharge of the nails discharged onto said chute from a cleaning machine, a conveyor or other apparatus, from the open forward end 22 of said chute into the weigh box 27 upon vibratory movement of said chute.

A horizontal plate 23 is guided on the main frame 11 above the weigh box 27 for movement toward and away from the chute 15, to prevent the nails from falling therefrom after vibration of said chute has stopped at the termination of an operation of filling the weigh box 27. Once the desired weight of nails has been discharged by said chute into the weigh box 27 the plate 23 is moved into a position to prevent the discharge of nails from said chute, by the energization of a solenoid 24 contained within a housing 130.

The solenoid 24 includes an armature 135 having a yoke 136 at its free end, pivotally connected to a link 133 having pivotal connection with the upper end of a lever arm 137, pivotally mounted intermediate its ends on a support bracket 138 extending upwardly from a support and guide plate 132 for the plate 23. The lower end of the lever arm 137 is pivotally connected to a connector 145 having driving connection with the plate 23. A coil spring 141 connected between the connector 128 and a stationary ear 131, is provided to withdraw the shut-off plate 23 to its open position upon deenergization of the solenoid 24, to accommodate the nails to drop from the vibrating chute 15 into the weigh box 27 at the initiation of a filling operation of said box.

The weigh box 27 is closed at its bottom and has an open top with vertically extending side walls 29 extending upwardly from the bottom thereof, and a rear wall 30 connecting said side walls together. Said weigh box also has a vertically movable front wall, or door 28, slidably guided in guides 29a, extending vertically along the forward ends of the side walls 29, as shown in FIGURE 9. The side walls 29 are provided at their lower forward corner portions with a bearing 31, forming bearings for pivot pins 32, mounted in a support frame or carriage 37 and pivotally mounting the weigh box 27 on said support frame. The movable front wall 28 is provided with rollers 33 at opposite sides of the lower end thereof, engageable with inclined runways or cam rails 35 extending forwardly from the support frame 37 from positions adjacent the pivot pins 32 and inclined upwardly with respect thereto, for raising the door 28 upon forward tilting movement of the weigh box 27, as shown in FIGURES 6, 7 and 8.

The box supporting frame or carriage 37 is guided for free vertical movement along parallel spaced guide rails 40 extending upwardly from the main frame 11 and spaced above the base plate 41 of said main frame, as shown in FIGURES 2 and 15.

As shown in FIGURE 10, the support frame, or carriage 37, has an open bottom generally rectangular in form and has upright side bars 39 extending vertically with respect to said bottom, intermediate the ends thereof.

Laterally spaced anti-friction bearings 42 are mounted adjacent opposite ends of the side bars 39 for rolling engagement with opposite sides of the guide rails 40 for guiding the carriage 37, for vertical movement along said guide rails 40.

The carriage 37 in turn is supported in an elevated position by weighing mechanism 105 and is lowered as the nails filling the box 27 overbalance the weighing mechanism, as will hereinafter more clearly appear as this specification proceeds.

The weigh box 27 is tilted and the door 28 is opened, to discharge the weighed nails from said weigh box by operation of a vertically guided pusher arm 76 suitably guided in the main frame 11 for vertical movement with respect thereto and having spaced rollers 77 mounted at its upper end for engagement with the bottom of the weigh box 27. The rollers 77 and upper end portion of the arm extend through the open portion of the carriage 37 into a position to engage and tilt the weigh box 27 about the axis of the pins 32, and to effect opening of the door 28 by movement of the rollers 33 along the cam rails 35 as the pusher arm 76 is moved in an upward direction.

The pusher arm 76 is vertically moved by operation of a cam 70 mounted on a horizontal shaft 71 journalled in a bearing support 71a. The cam 70 engages a follower end 72 of a lever arm 73, pivoted intermediate its ends to an upright support 74. The end of the lever arm 73 opposite the follower 72, is pivotally connected with the lower end of the pusher arm 76, as by a pivot pin 75. The cam 70 will thus move the pusher arm 76 upwardly as its lobe engages the follower end 72 and will accommodate the pusher arm 76 to move downwardly by gravity as the follower end 72 moves along the low portion of the cam.

The shaft 71 is shown as being driven from a motor 36 through a chain and sprocket drive 36a and a one-revolution clutch 106, is shown in FIGURE 3.

The one-revolution clutch 106 may be of any form well known to those skilled in the art, and as diagrammatically shown in FIGURE 3, is controlled by a dog 106a, connected with an armature 143a of a solenoid 143, and retractibly moved to release the dog upon energization of said solenoid to effect operation of the shaft 71 for one revolution.

A vertically movable open ended hopper 45 is positioned beneath the weight box 27 and has an inverted frusto-conical discharge end portion extending within a container or carton 50 during filling thereof, and is raised above said carton at the termination of the filling operation to accommodate the filled carton to be pushed to a conveyor and be replaced by an empty carton.

The nails flowing from the weigh box 27 pass along an inclined trough 46 extending downwardly from the frame 11 to the hopper 45, to confine the nails to drop into the open upper end of said hopper, and to fall into the container or carton 50, positioned beneath said hopper.

The hopper 45 has brackets 53 extending laterally from opposite sides thereof, as shown in FIGURE 2. Said brackets have vertical legs 55 welded or otherwise secured to the outer ends thereof and extending upwardly and downwardly thereupon. The legs 55 have pairs of laterally spaced rollers 59 mounted adjacent the upper and lower ends thereof on the outer sides thereof and engaging opposite sides of vertical guide strips 56, stationarily mounted on the main frame 11 as shown in FIGURES 2 and 5. Downward movement of the hopper 45 is limited by rollers 54 mounted on the inner sides of the legs 55 and supported on rectilinearly movable cam bars 60. The cam bars 60 are provided with rollers 64 at their forward ends forming rolling supports therefor on the webs of upwardly opening channels 63 stationarily mounted on the machine frame 11, the cam bars 60 have camming surfaces curving upwardly from the ends thereof adjacent the rollers 64, to raise the hopper 45, as a box of nails is filled, by translational movement of said cam bars in a direction shown in FIGURE 11 as being to the right.

The cam bars 60 are operated by a rocking arm 88 pivoted at its upper end to a bracket 86 extending rearwardly from the rear end portion of the machine. A pin 87 is provided to pivotally support the rocking arm 88 on the bracket member 86. The lower end of the rocking arm 88 extends between two rollers 89 and 90 journalled between the furcations of a bifurcated arm 96 welded or otherwise secured to a vertically extending plate 95 of a carton pusher device 91, and extending rearwardly therefrom. The cam bars 60 are shown in FIGURE 13 as being welded or otherwise secured to the forward face of the plate 95 and as extended forwardly therefrom.

The arm 88 is rocked back and forth to rectilinearly move the cam bar 60 to raise and lower the hopper 45 with respect to the carton 50 by operation of a crank arm 93 connected with the end of a fly wheel shaft 94 and keyed or otherwise secured thereto. A link 92, pivotally mounted on the end of the crank 93 has pivotal connection with the rocking arm 88 for oscillatably moving said arm upon rotation of said crank.

The fly wheel shaft 94 and crank arm 93 are rotatably driven through a one-revolution clutch 104, digrammatically illustrated in FIGURE 4 and coaxial with the shaft 94. The one-revolution clucth 104 is released by a dog 43 to effect the driving of said shaft for one revolution, as is well known to those skilled in the art so not herein shown or described in detail. The dog 43 is connected with an armature 44 of a solenoid 167, through a linkage connection 43a, to release the one-revolution clutch upon energization of said solenoid.

The carton 50 is shaken or vibrated to settle the nails in the box in densest relation by operation of an eccentric 67 driven by an electric motor 65 through a suitable geared reduction device contained within a housing 66, which may be a well known form of worm and worm gear reduction unit. An eccentric arm 68 journalled on the eccentric 67 is pivotally connected with a carton carriage 69 for the box 50, to reciprocably move said carriage and the box 50 upon rotation of the eccentric 67. The carriage 69 is supported on rollers 49 arranged thereunder and supporting said carriage on a retainer 48 stationarily supported on the main frame 11. The carriage 69 in turn has rollers 80 mounted adjacent the bottom thereof and extending transversely of the rollers 49.

As shown in FIGURES 2, 3 and 13, a series of empty cartons 50 is stacked in the open framework 81 retaining all of the cartons except the lowermost carton in stacked relation with respect to each other. The lowermost carton 50 rests on rollers 83 journalled at their opposite ends on I beams 83a extending along the machine frame and having upper faces in the same plane as the plane of the upper faces of the rollers 80 in the carriage 69.

The mechanism for pushing the lowermost carton of the stack of cartons onto the carton carriage 69 in position to be filled, includes a pusher plate 98 spaced in advance of the plate 95 and extending parallel thereto and connected with the plate 95 by parallel spaced rods 97, the uppermost of said rods being flush with the top of the pusher plate 98 and in alignment with the top surface of the lowermost carton, to support the stack of cartons during the operation of pushing the lowermost carton into the carriage 69.

Thus, upon rocking movement of the arm 88 toward the stack of boxes, the cam bar 60 will be rectilinearly moved to raise the hopper 45 above the carton being loaded. The pusher plate 98 will then come into position to engage the end of the lowermost carton 50 and push said carton into position in the carriage 69, the empty carton pushing the loaded carton onto the conveyor 85, to be carried away for closing and sealing. During this pushing operation, the stack of cartons 50 will be supported in stacked relation with respect to each other in the open framework 81 on the rods 97 of the pusher. During return movement of the rocking arm 88 and withdrawal of the plate 98 from the stack of cartons, the stack of boxes will then drop in position to accommodate a next succeeding empty carton to be pushed into position to be loaded.

Figure 14:
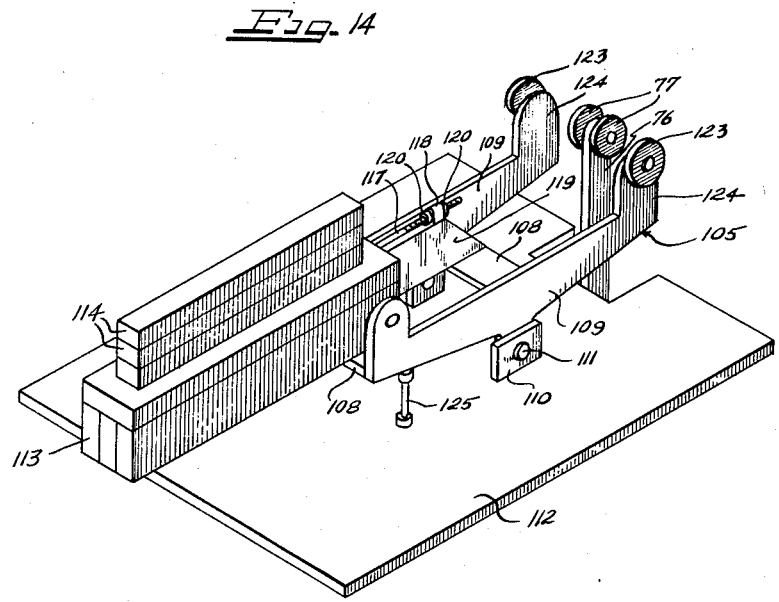
FIGURE 14 is a fragmentary perspective view of the weighing mechanism.

Referring now in particular to the means for automatically weighing the nails deposited in the weigh box 27 for discharge into a carton 50, a balanced beam type of weighing mechanism 105 is shown as being provided, which as herein shown, comprises two spaced rockable weigh beams 109 connected together by spacer bars 108. The beams 109 are pivotally mounted intermediate their ends in bearing supports 110 on antifraction bearings (not shown) mounted on shafts 111. The bearing supports 110 extend upwardly from a base plate 112 secured to the main frame 11 of the machine, as shown in FIGURES 2, 3 and 14. A counter weight 113 is shown as being mounted on the rear spacer bar 108 between upright ears on the rear end portions of the weigh beams 109 and may be bolted or otherwise secured thereto. Counter weights 114 are shown as being slidably mounted on the top surface of the counter weight 113 and as being connected to a threaded shaft 117 extending forwardly of the lowermost of said counter weights 114. The threaded shaft 117 extends through a lug 118, extending upwardly from a stop plate 119, mounted on the forward spacer bar 108 and abutting the lower counter weight 113. Lock nuts 120, threaded on the rod 17 on opposite sides of the lug 118, are provided to lock the counter weights 114 in position and to accommodate adjustable movement thereof along the counter weight 113 to balance the carriage 37 and weigh box 27. Rollers 123 mounted on ears 124, extending upwardly from the forward or inner ends of the beams 109 have supporting engagement with opposite sides of the base of the carriage 37, as shown in FIGURE 6.

When sufficient nails have been deposited in the weigh box 27 to overbalance the counter weights 113 and 114, the beams 109 will pivot about the axes of the shafts 111 to lower the carriage 37 and weigh box 27 supported thereon, the box supporting frame contacting a Micro-switch 102 and closing said switch. Closing of the switch 102 will stop vibration of the chute 15, effect movement of the plate 23 to prevent the dropping of nails from the end of the chute, will effect tilting of the carton and discharge of the load therefrom and will also start the carton shaking and removing cycle, in the proper sequence through an electric circuit, as will now be described.

Figure 17:
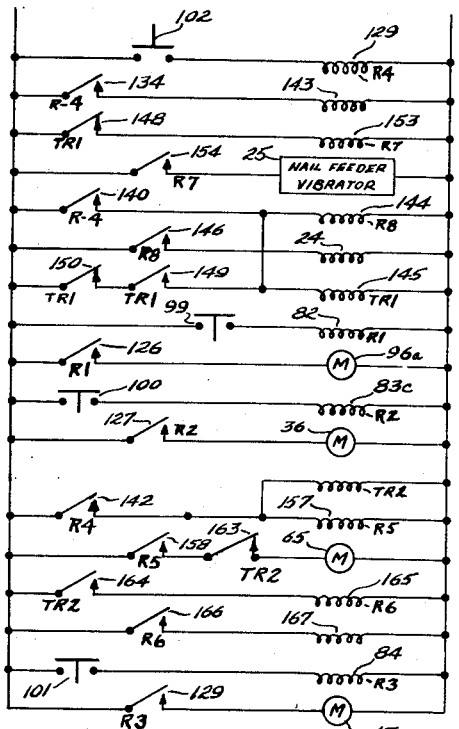
FIGURE 17 is a schematic diagram of the electrical control system employed in the nail weighing and boxing machine of this invention.

FIGURE 17 illustrates a line-to-line circuit diagram of the electrical control system employed. This type of diagram best illustrates the mode of operation, and in order to show with clarity the relation of the various relay solenoids to their associated contacts, each relay solenoid and contact in addition to being identified by a reference numeral, is also designated by an alphanumeric symbol identifying the associated relay. The relay contacts are illustrated in their normal open or closed positions. Relays R–1, R–2 and R–3 are energized to close the contacts thereof to energize pusher motor 96a, dumper motor 36, and conveyor motor 47 respectively by manual operation of push button switches 99, 100 and 101, respectively. This will effect energization of coil 82 of relay R–1, coil 83c of relay R–2 and coil 84 of relay R–3, thereby closing the respective contacts 126 of relay R–1, 127 of relay R–2, and 128 of relay R–3, to energize pusher motor 96, dumper motor 36 and conveyor motor 47 respectively.

Automatic operation occurs as follows: when the nail weighing box 27 is filled to proper weight, box support carriage 37 moves downwardly to momentarily close Micro-switch 102, thereby energizing coil 129 of relay R–4 to close contacts 134, 140 and 142. The closing of contacts 134 energizes solenoid 143 which actuates dumper clutch 106. The closing of contacts 140 energizes solenoids 144 and 145 associated with relay R–4 and timing relay TR–1 respectively. With solenoid 144 energized, relay contacts 146 are closed, energizing solenoid 24 to actuate the gate, or plate 23 to prevent the dropping of nails from the end of the nail feeder chute 15. With solenoid 145 energized, the normally closed contacts 148 are opened, the normally open contacts 149 are closed immediately, the latter contacts being holding contacts to maintain solenoids 144 and 145 of relay R–8 and timing relay TR–1 respectively energized for a predetermined time interval, after which normally closed contacts 150 open to deenergize the last-mentioned solenoids. With relay contacts 148 open, solenoid 153 of relay R–7 is deenergized and the associated contacts 154 open to stop operation of the nail feeder vibrator 25 for a predetermined time interval. With contacts 146 of relay R–8 closed, solenoid 24 is energized and the hold gate 23 at the end of the feeder chute 15 is closed while the weighing box 27 is dumping during the predetermined time interval. The closing of contacts 142 results in the energization of coils 156 of timing relay TR–2 and 157 of relay R–5. With solenoid 157 energized, the associated relay contacts 158 are closed, thereby energizing shaker motor 65 which remains operative for a predetermined time interval, after which normally closed contacts 163 are opened, deenergizing solenoid 157 of relay R–5 and opening the associated contacts 158 whereby shaker motor 65 is deenergized. After the same time interval, normally open contacts 164 are closed, energizing coil 165 of relay R–6 to close the associated contacts 166 and energize solenoid 167 which actuates pusher, one-revolution, clutch 104 on shaft 94.

Therefore, as micro-switch 102 is closed the motor 36 will operate the arm 76 to move the rollers 77 on the upper end thereof vertically, to tilt the box 27 about the axes of the pivot pins 32 and at the same time open the gate 28 by movement of the rollers 33 along the inclined camming surfaces of the cam rails 35, to effect the discharge of the nails along the chute 46 into the hopper 45 and container 50. (See FIGURE 8.) As the weigh box is emptied, the cam 70 will allow the arm 76 and rollers 77 to drop, accommodating the weigh box 27 to return to its upright position on the support frame 37 by gravity, and accommodating the counter weights 113 and 114 to elevate the weigh box and disengage the carriage 37 from the micro-switch 102 and initiate a next succeeding filling operation. Adjustable stops 125 are provided to limit return movement of the beams 109.

In operation of the device, the switches 99, 100 and 101 may be manually closed. This will energize the motors 96a, 36 and 47. The relay switch 148 being normally closed, the coil 153 of the relay R–7 will be energized to close the relay switch 154 and energize the nail feeder vibrator 25 and effect operation of the vibrating nail conveying chute 15 to convey nails into the weigh box 27.

As the weigh box is filled with a predetermined quantity of nails which, for example, may weigh 50 pounds, the counter weights 113 and 114 will be overbalanced and the carriage 37 will engage and close the micro-switch 102 and energize the relay coil 129. This will effect energization of the relay coil 145 and opening of the normally closed contact 148 to deenergize the relay coil 153 and effect opening of the relay switch 154 and deenergization of the nail feeder vibrator. The feeding of nails will then stop. At the same time the solenoid 24 will be energized and plate 23 will be moved to prevent the dropping of nails from the end of the chute 15.

The coil of solenoid 143 will also be energized to effect operation of the dumping clutch 106 and operation of the pusher arm 76 to tilt the weigh box 27 and at the same time open the door 28 by movement of rollers 33 along the inclined cam rails or runways 35 as the weigh box 27 tilts. The nails will then fall from the weigh box 27 along the chute 46 and hopper 45 into an empty carton 50. At the same time, the relay coil 157 is energized to energize the motor 65 through the contact 158 of the relay R–5. The carton carriage 69 will then be shaken to arrange the nails in the carton 50 in densest relation. The contacts 163 of the timing relay TR–2 will open after a predetermined time delay interval and the motor 65 will stop. As the motor 65 stops, the contacts 164 of the relay TR–2 will close and energize the coil 165 of the relay R–6, closing the relay switch 166 of said relay. This will energize the solenoid coil 167 and effect release of the pawl, or dog, 43 from the one-revolution clutch 104, to effect movement of the rocking arm 88 in a direction, which in FIGURE 4 is shown as being to the left to operate the cam bars 60 and raise the hopper 45 above the filled carton 50 and to then bring the pusher plate 98 into engagement with an empty carton and push the empty carton to engage and push a full carton onto the conveyor 85, to be carried away for sealing. Return movement of the arm 88 effected by rotation of the crank 93 for the second half of its one-revolution will lower the hopper 45 into the next succeeding empty carton 50 and return the pusher plate 98 from beneath the stack of boxes and accommodate the stack to drop onto the rollers 83.

As the nails are discharged from the weigh box 27, the weigh box will return to its upright position by gravity, as the arm 76 and rollers 77 move downwardly, while the counter weights 113 and 114 will raise the weigh box 27 to the position shown in FIGURE 6 in position for a next succeeding filling operation.

At this time, the carriage 37 will move out of engagement with the Micro-switch 102 to effect the energization of the relay coil 129 and opening of the relay switches 134 and 140 as well as the relay switch 146. Opening of the relay switch 146 will effect the deenergization of the solenoid coil 24 and the withdrawing of the plate 23 from the end of the shaker chute 15 by the spring 141. A next succeeding nail feeding and weighing operation may then be initiated in the sequence just described.

It is apparent from the foregoing that various modifications and variations in the present invention may be made without departing from the spirit and scope of the novel concepts thereof.

I claim as my invention:

1. In a weighing and boxing apparatus, a main frame, a carriage guided in said main frame for vertical movement with respect thereto, a weigh box supported on said carriage and pivotally connected thereto for tilting movement about a horizontal axis, said weigh box having an open top, parallel spaced side walls and a vertically slidable door guided therein, means for opening said door comprising cam rails extending from said carriage from a position adjacent the pivot of said weigh box and anti-friction rollers engaging said rails to effect vertical opening movement of said door upon tilting movement of said weigh box, weighing means supporting said carriage and weigh box in an elevated position during filling of said weigh box and accommodating said carriage and weigh box to lower upon the filling of said weigh box with the predetermined weight of material, a vertically guided arm engageable with said weigh box for tilting said weigh box upon upward movement thereof, and means operated upon lowering movement of said weigh box for effecting upward movement of said arm to tilt said weigh box and effect opening of said door.

2. In a nail weighing and carton filling apparatus, a main frame, a carriage guided in said main frame for vertical movement with respect thereto, weighing means supporting said carriage in an elevated position and accommodating lowering movement thereof upon the overbalancing of said weighing means, a weigh box supported on said carriage and pivotally connected thereto for tilting movement about a horizontal axis disposed adjacent the bottom of said weigh box, said weigh box having a vertically movable front door, a camming connection between said carriage and said door for raising said door to an open position upon tilting movement of said weigh box including at least one cam rail projecting from said carriage and follower means on said door engaging said cam rail; conveyor means for filling said weigh box, a pusher arm engageable with said weigh box, means for vertically moving said pusher arm to tilt said weigh box to effect opening of said door and the discharge of the contents of said weigh box, a carton carrier in receiving relation with respect to said weigh box adapted to retain an empty carton in position for filling, and means operated by lowering movement of said carriage and weigh box effected by the filling of a predetermined weight of material in said weigh box to tilt said weigh box to discharge its load and then to shake said carrier and arrange the nails deposited in a nail packaging carton therein in densest relation.

3. In a nail weighing and carton filling apparatus, a main frame, upright guides on said main frame, a carriage, anti-friction means for guiding said carriage for vertical movement along said guides, a weigh box having an open top supported on said carriage and pivotally connected thereto for tilting movement about a horizontal axis disposed adjacent the bottom of said weigh box, a weigh beam supporting said carriage in elevated position along said upright guides, a vibrating chute for filling said weigh box, electrically energizable means for operating said chute, a vertically guided pusher bar engageable with said weigh, means for vertically moving said pusher bar to tilt said weigh box and effect the dumping of the nails therefrom, electrically energizable means for effecting operation of said pusher bar, and a limit switch disposed beneath said weigh box and engaged by said carriage upon lowering movement of said carriage and weigh box upon overbalancing by said weigh beam by the discharge of a predetermined weight of nails therein, to deenergize said electrically energizable means from vibrating said chute and to energize said electrically energizable means for effecting upward movement of said pusher bar to dump said weigh box.

4. In a nail weighing and carton filling apparatus, a main frame, upright guides on said main frame, a carriage, anti-friction means for guiding said carriage for vertical movement along said guides, a weigh box having an open top supported on said carriage and pivotally connected thereto for tilting movement about a horizontal axis disposed adjacent the bottom of said weigh box, a rockable weigh beam rockingly mounted on said main frame for supporting said carriage and weigh box in an elevated position for filling, a vibrating chute having a discharge end in material discharge relation with respect to said weigh box, electrically energizable means for vibrating said chute, a plate slidably guided above said weigh box and movable into position adjacent said chute to prevent the discharge of nails therefrom, electrically energizable means for moving said plate to prevent the discharge of nails from said chute at the termination of a filling operation, a pusher arm engageable with the bottom of said weigh box, electrically energizable means for vertically moving said pusher arm to tilt said weigh box, and a limit switch operated by downward movement of said carrier and weigh box to deenergize said electrically energizable means for vibrating said chute, to energize said electrically energizable means to position said plate to prevent the discharge of nails from said chute and to energize said electrically energizable means to effect operation of said pusher arm to tilt said weigh box to discharge the contents thereof.

5. In a nail weighing and carton filling apparatus, a main frame, upright guides on said main frame, a carriage, anti-friction means for guiding said carriage for vertical movement along said guides, a weigh box supported on said carriage and pivotally connected thereto for movement about a horizontal axis disposed adjacent the lower end thereof, a weigh beam supporting said carriage and weigh box in an elevated position and accommodating lowering movement of said carriage and weigh box upon the filling of said weigh box with sufficient nails to overbalance said weigh beam, said weigh box having an open top and a vertically movable front wall, a cam rail extending from said carriage from the position adjacent the pivot of said weigh box and inclined upwardly with respect thereto, follower means on said front wall engageable with said cam rail for moving said front wall vertically to open said weigh box upon tilting movement thereof, a vertically guided pusher arm engageable with said weigh box for tilting said weigh box upon upward movement of said arm, operating means for moving said pusher arm upwardly to tilt said weigh box, and means operated by lowering movement of said weigh box for effecting upward movement of said pusher arm to tilt said weigh box and move said follower means along said cam rail to open said door and accommodate the discharge of nails from said weigh box.

6. In a nail weighing and carton filling apparatus, a main frame, upright guides on said main frame, a carriage, anti-friction means for guiding said carriage for vertical movement along said guides, a weigh box supported on said carriage and pivotally connected thereto for movement about a horizontal axis disposed adjacent the lower end thereof, a weigh beam supporting said carriage and weigh box in an elevated position and accommodating lowering movement of said carriage and weigh box upon the filling of said weigh box with sufficient nails to overbalance said weigh beam, said weigh box having an open top and a vertically movable front wall, a cam rail extending from said carriage from a position adjacent the pivot of said weigh box and inclined upwardly with respect thereto, follower means on said vertically movable front wall engageable with said cam rail for moving said front wall vertically to open said weigh box upon tilting movement of said weigh box, a vertically guided pusher arm engageable with said weigh box for tilting said weigh box upon upward movement of said arm, operating means for moving said pusher arm upwardly to tilt said weigh box, a vibrating chute having discharge end in material discharge relation with respect to said weigh box for filling the same, electrically energizable means for effecting vibration of said chute, electrically energizable means for effecting operation of said operating means for said pusher arm to tilt said weigh box, and a limit switch operated by lowering movement of said carriage and weigh box by the deposit of a predetermined weight of the nails in said box for deenergizing said electrically energizable means for vibrating said chute and energizing said electrically energizable means for effecting operation of said operating means for tilting said weigh box to tilt said weigh box and move said follower means along said cam rail to effect the opening of said door and the discharge of the contents of said weigh box.

7. A nail weighing and filling apparatus in accordance with claim 6 in which a movable plate is guided above said weigh box for movement toward said vibrating chute to prevent the discharge of nails from said chute to said weigh box, in which a spring is provided to bias said plate away from said chute and in which a solenoid energizable by closing of said limit switch upon deenergization of said electrically energizable means for vibrating said chute, to move said plate into position with respect to said chute to prevent the discharge of nails thereupon at the termination of a nail filling operation.

8. A nail weighing and carton filling apparatus comprising a main frame, a carriage guided for vertical movement with respect to said main frame, a weigh box supported on said carriage and pivotally connected thereto for movement about a transverse axis disposed adjacent the lower forward end of said weigh box, a weigh beam balancing said carriage and weigh box in an elevated position for filling, means for filling said weigh box with nails, tilting means operable upon overbalance of said weigh beam and lowering movement of said carriage and weigh box for tilting said weigh box to effect the discharge of nails therefrom, a carton carriage in material receiving relation with respect thereto, said carton carriage being adapted to contain a carton to be filled, pusher means engageable with an empty carton for pushing said empty carton into engagement with a filled carton on said carriage for removing said filled carton from said carriage and pushing said empty carton into material receiving relation with respect to said weigh box, a limit switch operated by lowering movement of said weigh box and carriage by a predetermined weight of nails deposited in said weigh box for stopping operation of said filling means, effecting operation of said tilting means to tilt said weigh box, and effecting operation of said pusher means to push an empty carton into engagement with a filled carton on said carriage and push the filled carton from said carriage and the empty carton onto said carriage at the termination of a carton filling operation.

9. A nail weighing and carton filling apparatus comprising a main frame, a carriage guided for vertical movement along said main frame, a weigh box supported on said carriage and pivotally connected thereto for movement about a transverse axis disposed adjacent the lower forward end of said weigh box, a weigh beam pivotally mounted on said main frame and balancing said weigh box and carriage in an elevated position, filling means for filling said weigh box, tilting means operated by lowering movement of said carriage and weigh box for tilting said weigh box to discharge a predetermined weight of nails therefrom, a hopper disposed beneath said weigh box in material receiving relation with respect thereto, and guided for vertical movement with respect to said main frame, means operable upon tilting movement of said weigh box for lowering said hopper into a carton to be filled with nails and for raising said hopper thereabove at the termination of the filling operation, and means for operating said raising means and pushing a filled carton of nails from beneath said hopper upon raising said hopper above a filled carton of nails.

10. A nail weighing and carton filling apparatus in accordance with claim 9 in which a limit switch operated by lowering movement of said carriage and weigh box upon overbalancing of said weigh beams by the nails in said box, serves to stop said filling means, actuate said tilting means, effect the raising of said hopper, the pushing of a full carton from beneath said hopper and the placing of an empty carton beneath said hopper, and the lowering of said hopper within said empty cartons.

References Cited in the file of this patent

UNITED STATES PATENTS

| | | |
|---|---|---|
| 493,796 | Smyser | Mar. 21, 1893 |
| 573,421 | Richards | Dec. 15, 1896 |
| 607,471 | Richards | July 19, 1898 |
| 688,059 | Bucklin | Dec. 3, 1901 |
| 1,087,078 | Bond | Feb. 10, 1914 |
| 1,421,925 | Elder | July 4, 1922 |
| 1,428,253 | Pieser et al. | Sept. 5, 1922 |
| 1,712,831 | Laurence | May 14, 1929 |
| 2,081,526 | Bleam | May 25, 1937 |
| 2,135,755 | Lawshe | Nov. 8, 1938 |
| 2,610,726 | Howard | Sept. 16, 1952 |
| 2,732,164 | Legrow et al. | Jan. 24, 1956 |
| 2,758,732 | Herzog et al. | Aug. 14, 1956 |